US010044459B2

(12) United States Patent
Chendamarai Kannan et al.

(10) Patent No.: US 10,044,459 B2
(45) Date of Patent: Aug. 7, 2018

(54) UPLINK CONTROL SIGNALING ON A SHARED COMMUNICATION MEDIUM

(71) Applicant: QUALCOMM Incorporated, San Diego, CA (US)

(72) Inventors: Arumugam Chendamarai Kannan, San Diego, CA (US); Tao Luo, San Diego, CA (US); Chirag Sureshbhai Patel, San Diego, CA (US); Tamer Adel Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 80 days.

(21) Appl. No.: 15/264,850

(22) Filed: Sep. 14, 2016

(65) Prior Publication Data
US 2017/0126346 A1 May 4, 2017

Related U.S. Application Data

(60) Provisional application No. 62/250,977, filed on Nov. 4, 2015.

(51) Int. Cl.
H04L 5/00 (2006.01)
H04L 5/14 (2006.01)
(Continued)

(52) U.S. Cl.
CPC .......... *H04J 3/1694* (2013.01); *H04L 5/0053* (2013.01); *H04L 5/1469* (2013.01);
(Continued)

(58) Field of Classification Search
CPC ............... H04L 5/0053; H04L 5/1469; H04W 72/0413; H04W 72/0446; H04W 74/02
See application file for complete search history.

(56) References Cited

U.S. PATENT DOCUMENTS

2002/0122395 A1* 9/2002 Bourlas .................. H04L 47/14
370/329
2003/0186718 A1* 10/2003 Raaf .................. H04W 52/221
455/522
(Continued)

FOREIGN PATENT DOCUMENTS

WO 2014179958 A1 11/2014

OTHER PUBLICATIONS

Partial International Search Report—PCT/US2016/054579—ISA/EPO—dated Dec. 12, 2016.
(Continued)

Primary Examiner — Ronald B Abelson
(74) Attorney, Agent, or Firm — Muncy, Geissler, Olds & Lowe, P.C.

(57) ABSTRACT

Disclosed are techniques for accessing a shared communication medium. An aspect includes communicating over the shared communication medium in accordance with a Time Division Duplexing (TDD) frame structure defining a set of downlink subframes and a set of uplink subframes, each uplink subframe being divided into a transmission gap period, a contention-exempt period, and a contention-compliant period, performing a contention procedure for contending for access to the shared communication medium during the transmission gap period, selectively transmitting contention-compliant uplink control signals during the contention-compliant period, and transmitting one or more contention-exempt uplink control signals during the contention-exempt period. An aspect includes receiving a downlink subframe of the shared communication medium and transmitting an acknowledgment of the downlink subframe during an uplink subframe of the shared communication medium, the uplink subframe occurring at least a predeter-
(Continued)

mined number of subframes and/or at least a predetermined amount of time after the downlink subframe.

14 Claims, 15 Drawing Sheets

(51) Int. Cl.
*H04W 72/04* (2009.01)
*H04W 74/02* (2009.01)
*H04J 3/16* (2006.01)

(52) U.S. Cl.
CPC ... *H04W 72/0413* (2013.01); *H04W 72/0446* (2013.01); *H04W 74/02* (2013.01)

(56) References Cited

U.S. PATENT DOCUMENTS

| | | | |
|---|---|---|---|
| 2008/0070615 A1* | 3/2008 | Obuchi | H04L 1/0027 455/522 |
| 2009/0180435 A1 | 7/2009 | Sarkar | |
| 2010/0027446 A1 | 2/2010 | Choi et al. | |
| 2010/0195587 A1 | 8/2010 | Ratasuk et al. | |
| 2014/0086116 A1 | 3/2014 | Seo et al. | |
| 2015/0098397 A1* | 4/2015 | Damnjanovic | H04W 74/08 370/329 |

OTHER PUBLICATIONS

International Search Report and Written Opinion—PCT/US2016/054579—ISA/EPO—Feb. 7, 2017.

* cited by examiner

UPLINK CONTROL SIGNALING ON A SHARED COMMUNICATION MEDIUM

CROSS-REFERENCE TO RELATED APPLICATIONS

The present application for patent claims the benefit of U.S. Provisional Application No. 62/250,977, entitled "UPLINK CONTROL SIGNALING ON A SHARED COMMUNICATION MEDIUM," filed Nov. 4, 2015, assigned to the assignee hereof, and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for contending for access to a shared communication medium includes communicating over the shared communication medium in accordance with a Time Division Duplexing (TDD) frame structure defining a set of downlink subframes and a set of uplink subframes, each uplink subframe being divided into a transmission gap period, a contention-exempt period, and a contention-compliant period, performing a contention procedure for contending for access to the shared communication medium during the transmission gap period, selectively transmitting one or more contention-compliant uplink control signals during the contention-compliant period based on an outcome of the contention procedure, and transmitting one or more contention-exempt uplink control signals during the contention-exempt period regardless of the outcome of the contention procedure.

A method for scheduling acknowledgments on a shared communication medium includes communicating, by an access terminal with an access point, over the shared communication medium in accordance with a TDD frame structure defining a set of downlink subframes and a set of uplink subframes, receiving, at the access terminal from the access point, a downlink subframe of the shared communication medium, and transmitting, by the access terminal to the access point, an acknowledgment of the downlink subframe during an uplink subframe of the shared communication medium, the uplink subframe occurring at least a predetermined number of subframes after the downlink subframe, at least a predetermined amount of time after the downlink subframe, or any combination thereof.

In an aspect, an apparatus for contending for access to a shared communication medium includes a transceiver and at least one processor configured to cause the transceiver to: communicate over the shared communication medium in accordance with a TDD frame structure defining a set of downlink subframes and a set of uplink subframes, each uplink subframe being divided into a transmission gap period, a contention-exempt period, and a contention-compliant period, perform a contention procedure for contending for access to the shared communication medium during the transmission gap period, selectively transmit one or more contention-compliant uplink control signals during the contention-compliant period based on an outcome of the contention procedure, and transmit one or more contention-exempt uplink control signals during the contention-exempt period regardless of the outcome of the contention procedure.

An apparatus for scheduling acknowledgments on a shared communication medium includes a transceiver of an access terminal and at least one processor of the access terminal configured to cause the transceiver to: communicate, with an access point, over the shared communication medium in accordance with a TDD frame structure defining a set of downlink subframes and a set of uplink subframes, receive, from the access point, a downlink subframe of the shared communication medium, and transmit, to the access point, an acknowledgment of the downlink subframe during an uplink subframe of the shared communication medium, the uplink subframe occurring at least a predetermined number of subframes after the downlink subframe, at least a predetermined amount of time after the downlink subframe, or any combination thereof.

In an aspect, an apparatus for contending for access to a shared communication medium includes means for communicating over the shared communication medium in accordance with a TDD frame structure defining a set of downlink subframes and a set of uplink subframes, each uplink subframe being divided into a transmission gap period, a contention-exempt period, and a contention-compliant period, means for performing a contention procedure for contending for access to the shared communication medium during the transmission gap period, means for selectively transmitting one or more contention-compliant uplink control signals during the contention-compliant period based on an outcome of the contention procedure, and means for transmitting one or more contention-exempt uplink control signals during the contention-exempt period regardless of the outcome of the contention procedure.

An apparatus for scheduling acknowledgments on a shared communication medium includes means for communicating, by an access terminal with an access point, over the shared communication medium in accordance with a TDD frame structure defining a set of downlink subframes and a set of uplink subframes, means for receiving, at the access terminal from the access point, a downlink subframe of the shared communication medium, and means for transmitting, by the access terminal to the access point, an acknowledgment of the downlink subframe during an uplink subframe of the shared communication medium, the uplink subframe occurring at least a predetermined number of subframes after the downlink subframe, at least a predetermined amount of time after the downlink subframe, or any combination thereof.

In an aspect, a non-transitory computer-readable medium for contending for access to a shared communication medium includes at least one instruction to communicate over the shared communication medium in accordance with a TDD frame structure defining a set of downlink subframes and a set of uplink subframes, each uplink subframe being divided into a transmission gap period, a contention-exempt period, and a contention-compliant period, perform a contention procedure for contending for access to the shared communication medium during the transmission gap period, selectively transmit one or more contention-compliant uplink control signals during the contention-compliant period based on an outcome of the contention procedure, and transmit one or more contention-exempt uplink control signals during the contention-exempt period regardless of the outcome of the contention procedure.

A non-transitory computer-readable medium for scheduling acknowledgments on a shared communication medium includes at least one instruction to cause an access terminal to communicate, with an access point, over the shared communication medium in accordance with a TDD frame structure defining a set of downlink subframes and a set of uplink subframes, at least one instruction to cause the access terminal to receive, from the access point, a downlink subframe of the shared communication medium, and at least one instruction to cause the access terminal to transmit, to the access point, an acknowledgment of the downlink subframe during an uplink subframe of the shared communication medium, the uplink subframe occurring at least a predetermined number of subframes after the downlink subframe, at least a predetermined amount of time after the downlink subframe, or any combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to managing uplink control signaling on a shared communication medium. To better harmonize with various contention procedures that may be implemented on such a shared communication medium, one or more subframes of an uplink control channel, such as the Physical Uplink Control Channel (PUCCH) defined for Long Term Evolution (LTE) systems, may be configured to separate contention-exempt signaling from contention-compliant signaling. In this way, a transmission gap period may be introduced that facilitates the contention process for the contention-compliant signaling without interference from or to the contention-exempt signaling. To improve control channel scheduling for acknowledgment procedures such as Hybrid Automatic Repeat Request (HARQ), the uplink subframe in which acknowledgment signaling is to be sent may be designated to occur at least a predetermined number of subframes after the downlink subframe being acknowledged, at least a predetermined amount of time after the downlink subframe being acknowledged, or a combination thereof.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
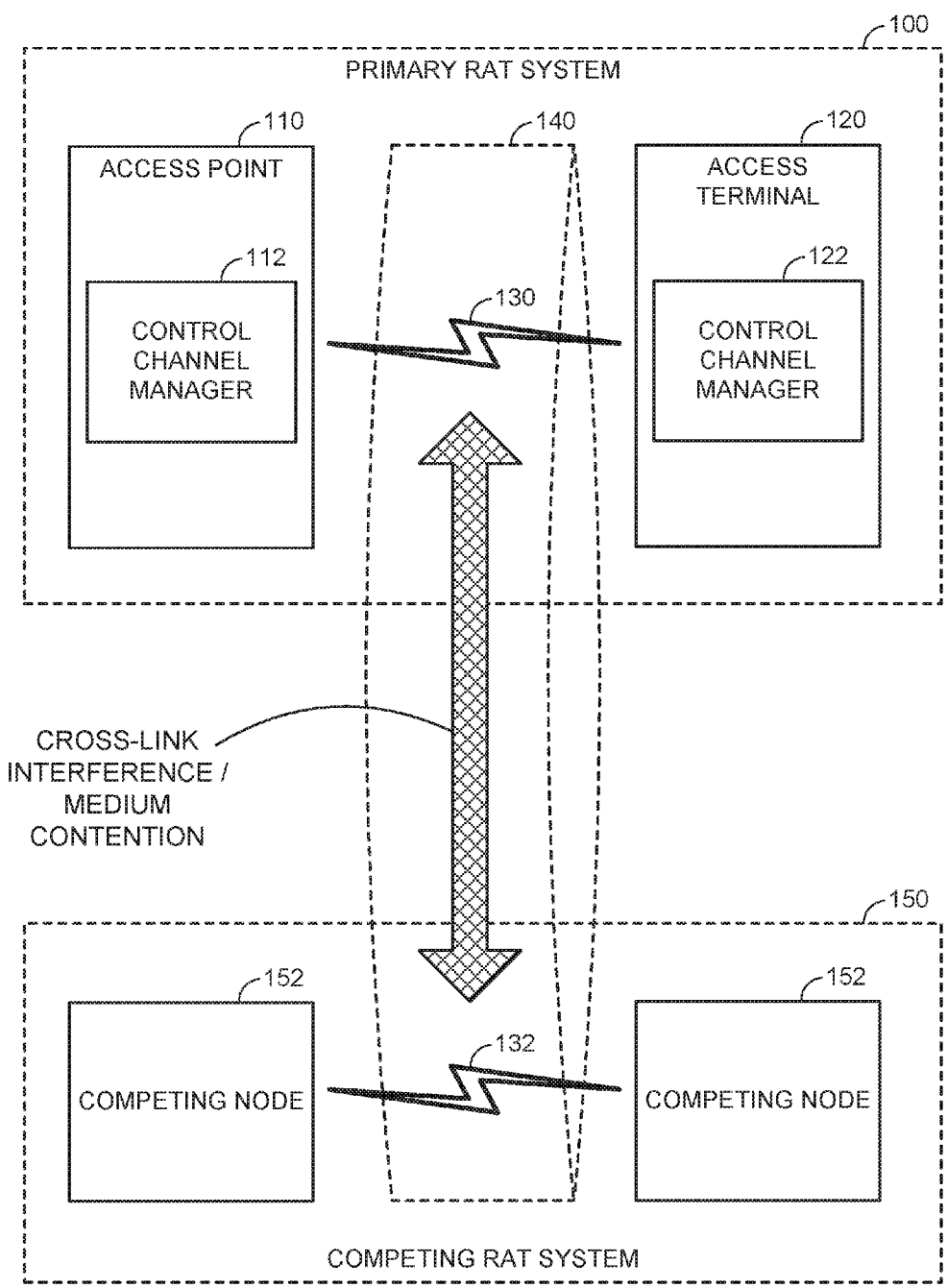
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (TOT)/Internet of Everything (TOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the shared communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the shared communication medium 140, there is the potential for cross-link interference between the wireless link 130 and the wireless link 132. Further, some RATs and some jurisdictions may require contention or "Listen Before Talk (LBT)" for access to the shared communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the uplink control signaling techniques discussed briefly above. For example, the access point 110 may include a control channel manager 112 and the access terminal 120 may include a control channel manager 122. The control channel manager 112 and/or the control channel manager 122 may be configured in different ways to manage uplink control signaling on the shared communication medium 140.

Figure 2:
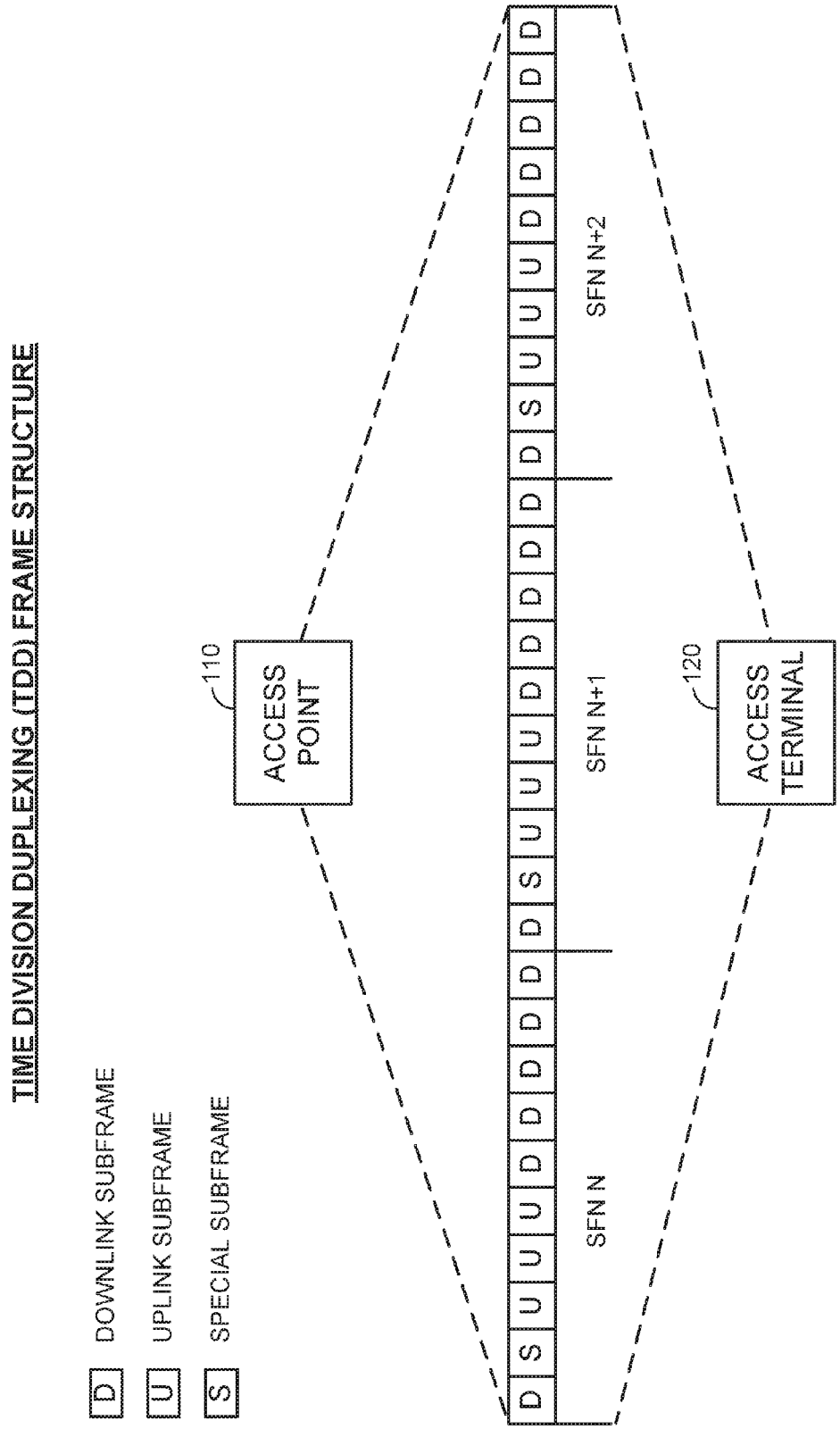
FIG. 2 illustrates an example Time Division Duplexing (TDD) frame structure in accordance with the techniques described herein.

FIG. 2 illustrates an example Time Division Duplexing (TDD) frame structure that may be implemented for the primary RAT system 100 in FIG. 1 to facilitate contention-based access to the shared communication medium 140.

The illustrated frame structure includes a series of radio frames (RFs) that are numbered in accordance with a System Frame Number (SFN) numerology (SFN N, N+1, N+2, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute an SFN cycle (e.g., lasting 10.24 s for 10 ms radio frames having 1 ms subframes). Each subframe may comprise two slots, and each slot may comprise six or seven symbol periods. The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes seven (7) TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE.

In some designs, the frame structure of FIG. 2 may be "fixed" in that the location of each frame/subframe may be predetermined in relation to an absolute time, but may or may not be occupied by primary RAT signaling in any given instance due to the contention procedure for accessing the shared communication medium 140. For example, if the access point 110 or the access terminal 120 fails to win contention for a given subframe, that subframe may be silenced. In other designs, however, the frame structure of FIG. 2 may be "floating" in that the location of each frame/subframe may be dynamically determined in relation to the point at which access to the shared communication medium 140 is secured. For example, the start of a given frame (e.g., SFN N) may be delayed in relation to an absolute time until the access point 110 or the access terminal 120 is able to win contention.

As will be described in more detail below, one or more of the uplink subframes may be configured, in whole or in part, to provide an uplink control channel structure that separates contention-exempt signaling from contention-compliant signaling to better support uplink control signaling within the primary RAT system 100 on the shared communication medium 140. While some control signaling may be exempted from contention requirements—due, for example, to special exemptions for short transmission durations— other control signaling may require compliance with the contention rules employed. As an example, the Physical Uplink Control Channel (PUCCH) defined for LTE to carry acknowledgment messages, channel quality indicators, scheduling requests, and so on, may be modified to separate CCA-exempt signaling from CCA-compliant signaling. By separating signaling based on contention requirements, a transmission gap period may be introduced that facilitates the contention process for the contention-compliant signaling without interference from or to the contention-exempt signaling.

Figure 3:
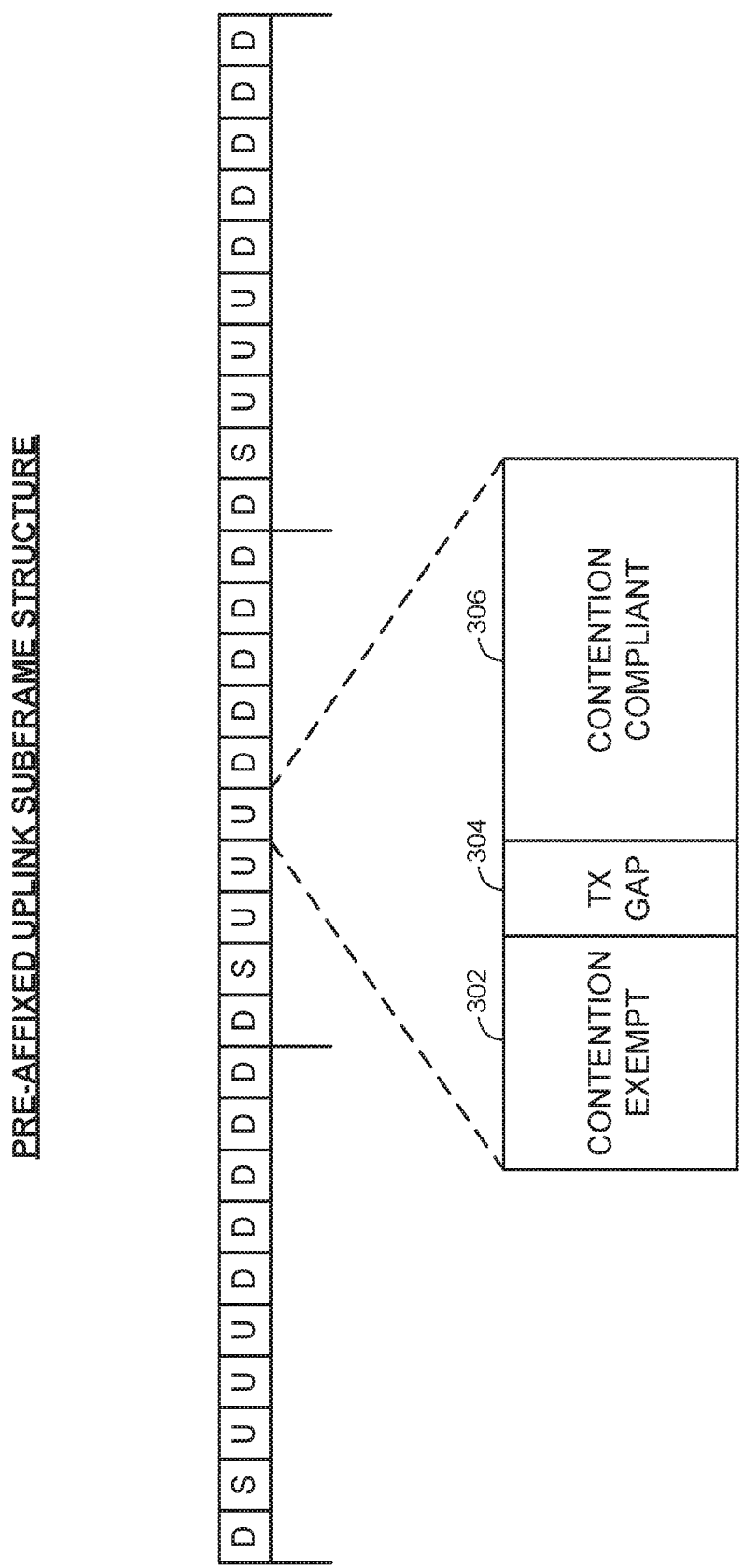
FIG. 3 illustrates an example uplink subframe structure in accordance with the techniques described herein.

FIG. 3 illustrates an example uplink subframe structure that may be implemented for the primary RAT system 100 in FIG. 1. In this design, the uplink subframe or a portion thereof may include a contention-exempt period 302 and a separate contention-compliant period 306, separated by an intervening transmission (TX) gap period 304. This design may be referred to as a "pre-affixed" design with the contention-exempt period 302 being affixed to the subframe prior to the contention-compliant period 306. The configuration of one uplink subframe is shown for illustration purposes only. It will be appreciated that a similar configuration may be applied to only a portion of the uplink subframe, to multiple uplink subframes, to other subframes having a segment dedicated to uplink signaling (e.g., a special subframe), and so on.

In the contention-exempt period 302, the access terminal 120, for example, along with any other wireless nodes in the primary RAT system 100 scheduled for the transmission of uplink control signaling, may transmit any such signaling that is exempt from contention requirements (e.g., short, CCA-exempt PUCCH transmissions) without contending for access to the shared communication medium 140.

In the transmission gap period 304, transmission by the access point 110, the access terminal 120, and any other wireless nodes in the primary RAT system 100 may be silenced. This provides an opportunity for the access terminal 120, for example, along with any other wireless nodes in the primary RAT system 100 scheduled for the transmission of uplink control signaling that is subject to contention requirements (e.g., long, CCA-compliant PUCCH transmissions) to contend with the competing RAT system 150 for access to the shared communication medium 140. As an example, the access terminal 120 may monitor signaling on the shared communication medium 140 in relation to a CCA back off threshold over a Contention Window (CW) of size N within the transmission gap period 304 (e.g., as bounded by a randomly-generated number q, with N spanning a number of slots between [1 . . . q]).

In the contention-compliant period 306, the access terminal 120 and/or any of the other wireless nodes in the primary RAT system 100 that win contention during the transmission gap period 304 may transmit their remaining uplink control signaling as scheduled. Otherwise, they may refrain from transmitting and the appropriate retransmission scheduling procedures may be instituted.

In general, the length of each of the contention-exempt period 302, the transmission gap period 304, and the contention-compliant period 306 may be fixed or dynamically determined and conveyed (e.g., via Radio Resource Control (RRC) signaling). For example, the access point 110 may set the length of the transmission gap period 304 to a nominal duration that is generally sufficient for contention (e.g., on the order of a few tens of microseconds), or may periodically adapt the length of the transmission gap period 304 based on the prevailing traffic conditions of the competing RAT system 150. As another example, the access point 110 may expand or reduce the length of the contention-exempt period 302 based on the expected number of such transmissions. Thus, in some instances, the access point 110 may reduce the length of the contention-exempt period 302 to zero when no contention-exempt transmissions are expected, effectively moving up the location of the transmission gap period 304 within the uplink subframe. To preserve the silence of the transmission gap period 304, its starting time and duration may be synchronized across the primary RAT system 100.

As will be described below with reference to FIGS. 4-5, the relative positions of the contention-exempt period 302, the transmission gap period 304, and the contention-compliant period 306 to the subframe boundary may be varied in different designs.

Figure 4:
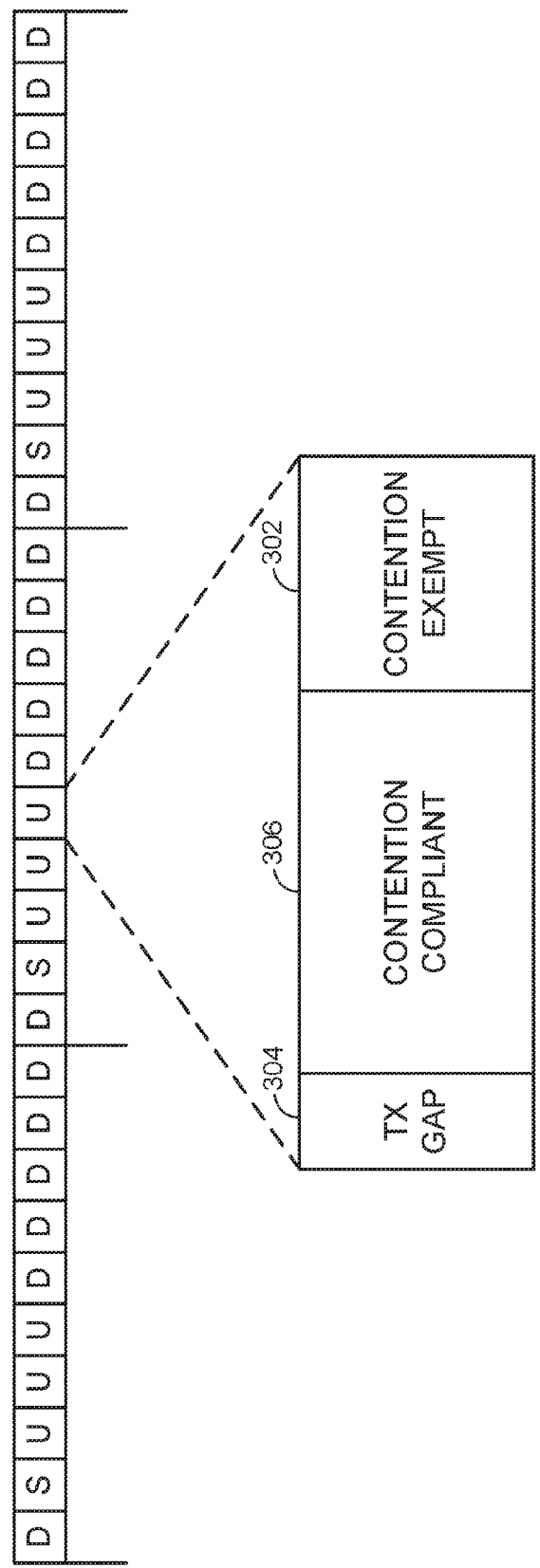
FIG. 4 illustrates another example uplink subframe structure in accordance with the techniques described herein.

FIG. 4 illustrates another example uplink subframe structure that may be implemented for the primary RAT system 100 in FIG. 1. This design is similar to the design of FIG. 3 described above, except with regard to the relative position of the contention-exempt period 302. This design may be referred to as a "post-affixed" design with the contention-exempt period 302 being affixed to the subframe after the contention-compliant period 306.

Figure 5:
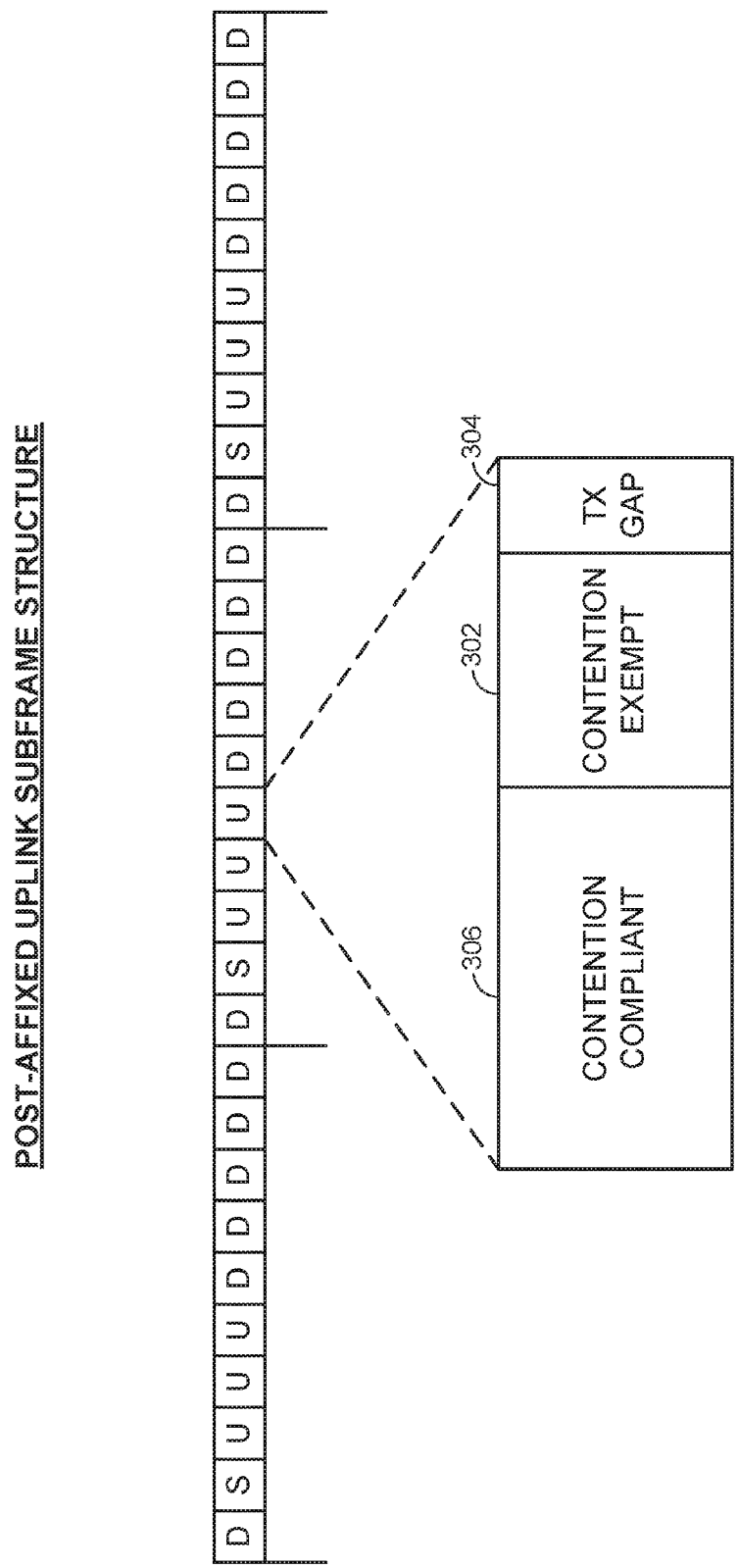
FIG. 5 illustrates another example uplink subframe structure in accordance with the techniques described herein.

FIG. 5 illustrates another example uplink subframe structure that may be implemented for the primary RAT system 100 in FIG. 1. This design is also similar to the design of FIG. 3 described above, except with regard to the relative position of the contention-exempt period 302. Similar to the design of FIG. 4, this design is another example of a "post-affixed" design in that the contention-exempt period 302 is affixed to the subframe after the contention-compliant period 306. However, in contrast to the design of FIG. 4, the transmission gap period 304 is positioned at the end of the subframe, after the contention-compliant period 306 and the contention-exempt period 302. Here, the transmission gap period 304 of the preceding subframe (e.g., SF3) provides the contention opportunity for the contention-compliant period 306 of the following subframe (e.g., SF4).

Regardless of the particular design employed, each of the contention-exempt period 302, the transmission gap period 304, and the contention-compliant period 306 may be subdivided (e.g., in frequency or code-space across resource elements) to accommodate multiple access terminals in accordance with an access terminal-multiplexing scheme.

Figure 6:
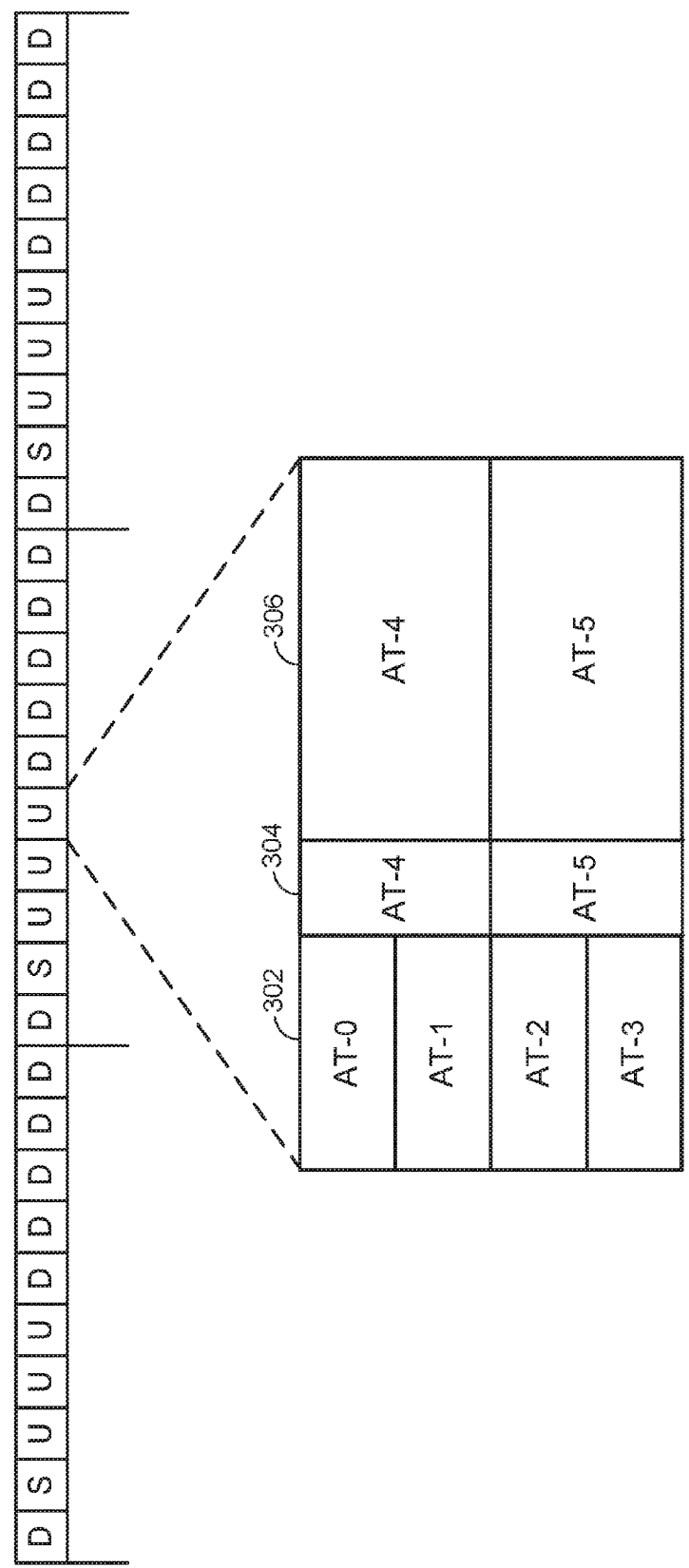
FIG. 6 is a multiplexing diagram illustrating an example access terminal-multiplexing scheme in accordance with the techniques described herein.

FIG. 6 is a multiplexing diagram illustrating an example access terminal-multiplexing scheme for the uplink subframe structure of FIG. 3. It will be appreciated that a similar access terminal-multiplexing scheme may be implemented for the uplink subframe structures of FIGS. 4-5.

As shown, each of the contention-exempt period 302, the transmission gap period 304, and the contention-compliant period 306 may be subdivided across access terminal resources, labeled, by way of as example, as AT-0 through AT-5. In particular, the contention-exempt period 302 may be subdivided across the access terminal resources AT-0, AT-1, AT-2, and AT-3, and the transmission gap period 304 and the contention-compliant period 306 may be subdivided across the access terminal resources AT-4 and AT-5. It will be appreciated that the different access terminal resources shown here may be utilized by different access terminals, or by the same access terminal having a plurality of transmissions to send. For example, the access terminal 120 may occupy both the access terminal resources AT-0 for its contention-exempt transmissions and the access terminal resources AT-4 for its contention-compliant transmissions.

As will be described in more detail below, the location of certain control signaling (e.g., the particular uplink subframes to be used for a given signal) may be scheduled for acknowledgment (ACK) procedures such as Hybrid Automatic Repeat Request (HARQ) in a manner that better supports operation on the shared communication medium 140.

The HARQ timeline represents the relationship between the time at which the access terminal 120 receives the grant of access to the PUCCH from the access point 110 on the downlink and the time at which it sends the ACK to the access point 110 on the uplink.

There are several considerations regarding the downlink HARQ timeline. As an initial consideration, the access terminal 120 may need several subframes of processing time (e.g., 4 ms in legacy LTE) before it can transmit the ACK on the PUCCH. In addition, the access terminal 120 may need to perform CCA before transmitting on the PUCCH, such as when it will be transmitting a long PUCCH. Further, the access point 110 may have given the access terminal 120 a downlink grant that is valid for multiple transmission time intervals (TTIs) spanning a variable number of TTIs. In this case, the access point 110 may need to determine which grant the access terminal 120 is acknowledging. As yet another consideration, the access terminal 120 may acknowledge multiple downlink subframes per one uplink subframe.

The present disclosure provides several approaches (illustrated in FIGS. 7 to 9) to address the above-noted considerations. Each of the proposed approaches has certain features in common. For example, the access terminal 120 can send a CCA-exempt ACK/NACK (negative acknowledgment) autonomously as defined by the particular approach. In the case of a lost ACK/NACK in the CCA-exempt transmission(s), the access point 110 can poll the access terminal 120 specifically to send the missing ACK/NACK. The access terminal 120 may send the response to such a poll via a scheduled, CCA-compliant ACK/NACK at location(s) scheduled by the access point 110.

Another common feature is related to the floating frame structure discussed above. Here, an attempt can be made to fit all ACK/NACK responses within the same transmission opportunity (TxOP). When the HARQ timeline does not allow this (e.g., where there are eight downlink frames followed by two uplink frames and the access terminal 120 processing time is limited to 2 ms), then the polling-based ACK/NACK scheme discussed above can be used as a supplement during the subsequent TxOP.

Figure 7:
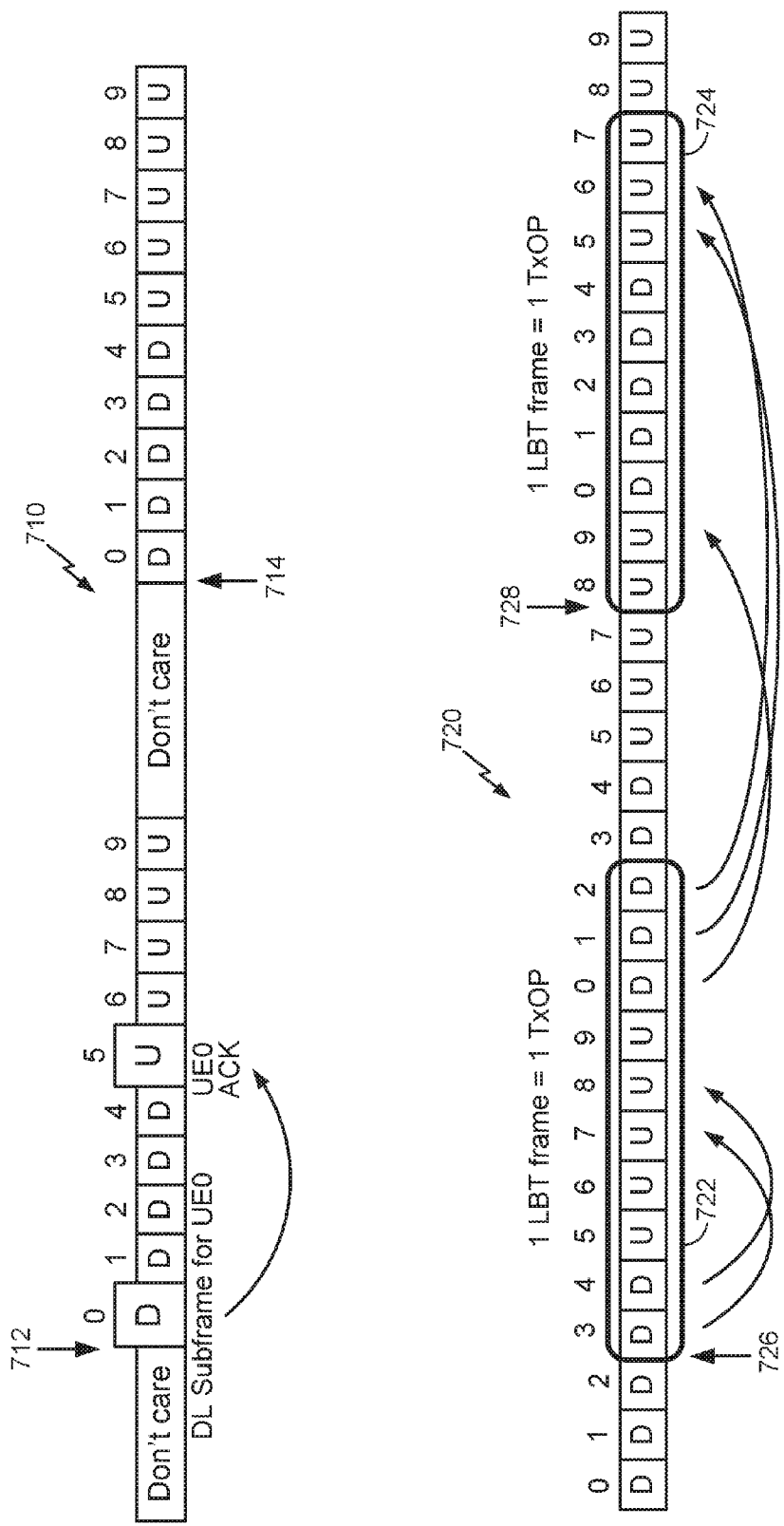
FIG. 7 illustrates exemplary Hybrid Automatic Repeat Request (HARQ) timing diagrams in accordance with the techniques described herein.

FIG. 7 illustrates exemplary HARQ timing diagrams based on the number of subframes according to at least one aspect of the disclosure. A HARQ timing diagram 710 illustrates a HARQ timeline having a floating frame structure, and a HARQ timing diagram 720 illustrates a HARQ timeline having a fixed frame structure. Each HARQ timing diagram 710 and 720 illustrates an exemplary pattern of five downlink subframes followed by five uplink subframes. As will be appreciated, however, there may be more or fewer than five downlink subframes and more or fewer than five uplink subframes, depending on the implementation.

As described above in relation to FIG. 2, in a floating frame structure implementation, such as the one depicted as 710 in FIG. 7, a frame only begins when the access point 110 wins contention of the medium (e.g., shared communication medium 140). Thus, the access point 110 may win contention of the medium at 712, at which point the frame begins, with scheduling of five downlink subframes followed by five uplink subframes. At the conclusion of the frame, there may be a period where the medium may be used by other devices or other RATs. In this intervening "don't care" period (from the perspective of the access point 110), there is no scheduling of any subframes such that when the access point 110 once again wins contention of the medium at 714, it may immediately begin with the frame pattern of five downlink subframes followed by five uplink subframes.

In a fixed frame structure, such as depicted as 720 in FIG. 7, radio frames have a fixed and continuous pattern, regardless of whether or not the access point 110 has control of the medium (e.g., shared communication medium 140). In such instances, the access point 110 follows the underlying downlink/uplink configuration of the radio frames when it has access to the medium. For example, the radio frames in 720 consist of five downlink subframes followed by five uplink subframes and are continuous in time so that the pattern of five downlink and five uplink subframes repeats itself one after another. While the underlying frame structure is fixed in time, the access point 110 may not always win contention of the medium at the first downlink subframe of the radio frame. In the depicted example, the access point 110 wins contention of the medium at 726. Accordingly, the access point 110 will begin an LBT frame 722 that begins at the fourth subframe (SF3) of the first radio frame and ends after the third subframe (SF2) of the next radio frame, where the LBT frame 722 follows the subframe pattern of the underlying radio frames. After the LBT frame 722 concludes, the access point 110 may relinquish control of the medium, but the underlying frame structure remains intact and continues the pattern. When the access point 110 once again gains access to the medium at 728, it adopts the underlying configuration of the radio frames for the next LBT frame 724. Thus, LBT frame 724 begins at the ninth subframe (SF8) of one radio frame and ends at the eighth subframe (SF7) of the next radio frame.

In both HARQ timing diagrams 710 and 720, the access terminal 120 attempts to send a CCA-exempt ACK of a scheduled downlink (D) subframe at the earliest uplink (U) subframe that is at least X subframes after the scheduled downlink subframe, as counted within the TxOPs of the access point 110. For example, if the legacy LTE time difference between reception of the scheduled downlink subframe and transmission of the ACK for the subframe on the uplink is maintained, X would be four subframes. However, X may be more or fewer than four subframes.

In the HARQ timing diagram 710, the access terminal 120 (represented in FIG. 7 as "UE0") receives a downlink subframe SF0 from the access point 110 at 712. The access terminal 120 may be ready to ACK the downlink subframe SF0 at subframe SF4 (i.e., four subframes after subframe SF0 where X is "4"), however, subframe SF4 is a downlink subframe, so the access terminal 120 waits until the next uplink subframe, here, subframe SF5. At that time, the access terminal 120 can transmit the ACK to the access point 110.

In the HARQ timing diagram 720, an exemplary LBT frame 722 equals one TxOP and another exemplary LBT frame 724 also equals one TxOP. As illustrated in the HARQ timing diagram 720, the access terminal 120 receives downlink subframes SF3 and SF4 from the access point 110 during the LBT frame 722. The access terminal 120 may ACK these downlink subframes four subframes later at uplink subframes SF7 and SF8 of LBT frame 722. After the uplink subframes, the access terminal 120 receives three more downlink subframes SF0 to SF2 during the LBT frame 722. However, the access terminal 120 is not able to ACK these subframes four subframes later, as the LBT frame 722 has ended. As such, the access terminal 120 waits until the next LBT frame, LBT frame 724, to ACK downlink subframes SF0 to SF2 of LBT frame 722. Here, although uplink subframe SF8 in LBT frame 724 is more than four subframes after downlink subframe SF0 in LBT frame 722, depending on when the access point 110 clears the shared communication medium 140, additional latency may be incurred (note, however, that while additional latency may be incurred, the advantage is collision minimization since the counting is based on the number of subframes). As such, in the example of FIG. 7, the access terminal 120 ACKs downlink subframe SF0 in LBT frame 722 at uplink subframe SF9 in LBT frame 724. The access terminal 120 then waits until after downlink subframes SF0 to SF4 in LBT frame 724 to ACK downlink subframes SF1 and SF2 in LBT frame 722. Specifically, the access terminal 120 ACKs downlink subframe SF1 in LBT frame 722 at uplink subframe SF5 in LBT frame 724 and downlink subframe SF2 in LBT frame 722 at uplink subframe SF6 in LBT frame 724.

In a further aspect, HARQ bundling may be used if the number of uplink subframes is smaller than the number of downlink subframes (not illustrated in FIG. 7). This minimizes access terminal collisions, but may incur increasing latency with the fixed frame structure.

Figure 8:
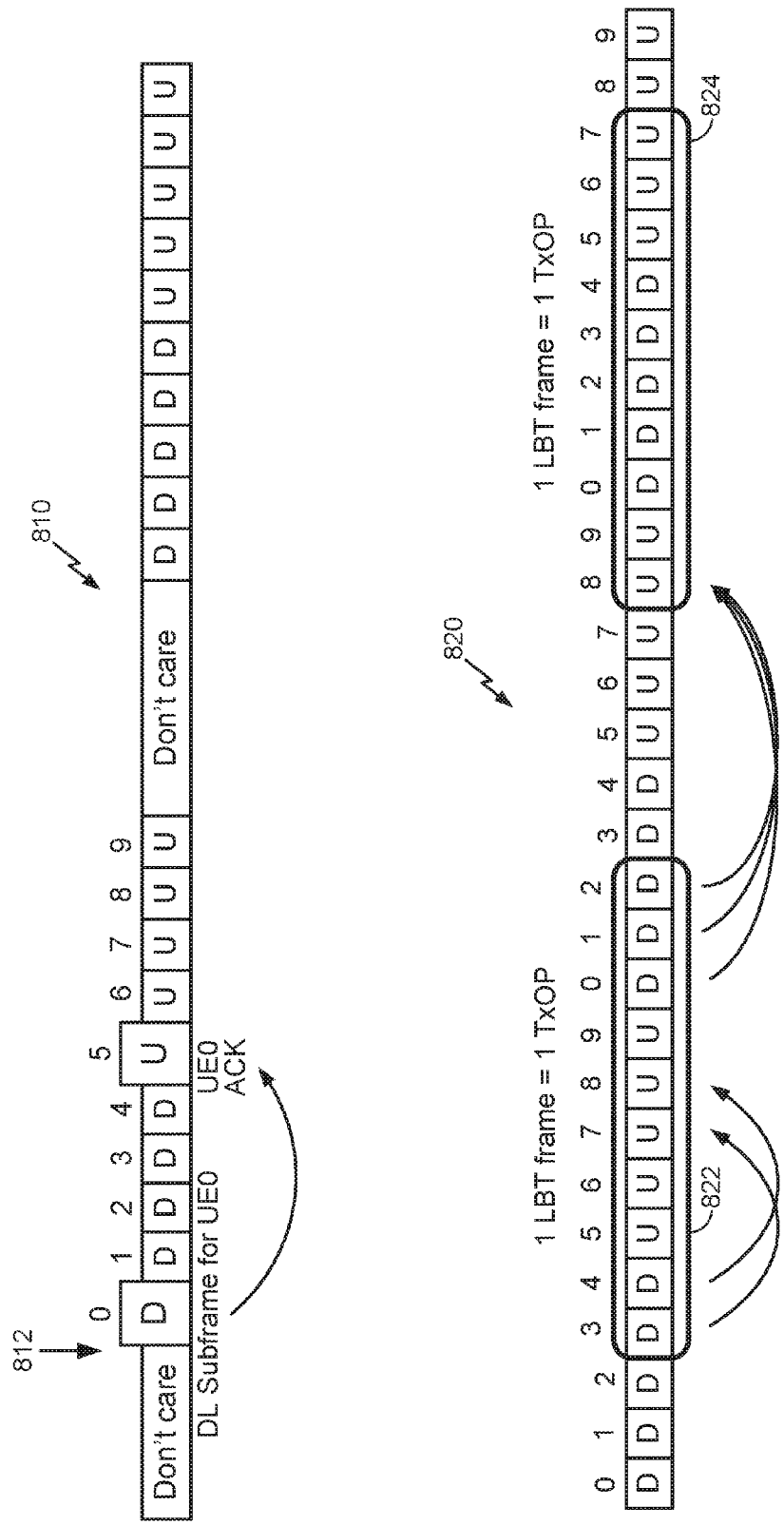
FIG. 8 illustrates other exemplary HARQ timing diagrams in accordance with the techniques described herein.

FIG. 8 illustrates exemplary HARQ timing diagrams based on absolute time according to at least one aspect of the disclosure. A HARQ timing diagram 810 illustrates a HARQ timeline having a floating frame structure, and a HARQ timing diagram 820 illustrates a HARQ timeline having a fixed frame structure. Each HARQ timing diagram 810 and 820 illustrates an exemplary pattern of five downlink subframes followed by five uplink subframes. As will be appreciated, however, there may be more or fewer than five downlink subframes and more or fewer than five uplink subframes, depending on the implementation.

In both HARQ timing diagrams 810 and 820, the access terminal 120 attempts to send a CCA-exempt ACK of a scheduled downlink (D) subframe at the earliest uplink (U) subframe that is at least X milliseconds (ms) after the scheduled downlink subframe, as counted within the TxOPs of the access point 110. For example, if the legacy LTE time difference is maintained, X would be four milliseconds. However, X may be more or fewer than four milliseconds.

In the HARQ timing diagram 810, the access terminal 120 (represented in FIG. 8 as "UE0") receives a downlink subframe SF0 from the access point 110 at 812. The access terminal 120 may be ready to ACK the downlink subframe SF0 at subframe SF4 (i.e., at least four milliseconds after subframe SF0), however, subframe SF4 is a downlink subframe, so the access terminal 120 waits until the next uplink subframe, here, subframe SF5. At that time, the access terminal 120 can transmit the ACK to the access point 110.

In the HARQ timing diagram 820, an exemplary LBT frame 822 equals one TxOP and another exemplary LBT frame 824 also equals one TxOP. As illustrated in the HARQ timing diagram 820, the access terminal 120 receives downlink subframes SF3 and SF4 from the access point 110 during the LBT frame 822. The access terminal 120 ACKs each of these downlink subframes at least four milliseconds later at uplink subframes SF7 and SF8, respectively, of LBT frame 822. After the uplink subframes, the access terminal 120 receives three more downlink subframes SF0 to SF2 during the LBT frame 822. However, the access terminal 120 is not able to ACK these subframes four milliseconds later, as the LBT frame 822 has ended. As such, the access terminal 120 waits until the next LBT frame, LBT frame 824, to ACK downlink subframes SF0 to SF2 of LBT frame 822. The access terminal 120 then ACKs downlink subframes SF0 to SF2 of LBT frame 822 at the first uplink subframe of LBT frame 824, i.e., uplink subframe SF8, because it is at least four milliseconds after each of downlink subframes SF0 to SF2 of LBT frame 822 was received.

Note that because the access terminal 120 ACKs downlink subframes SF0 to SF2 of LBT frame 822 at least four milliseconds later at the first uplink subframe of LBT frame 824, latency is minimized. However, due to the decreased latency, greater collisions are possible at least for the fixed frame structure of the HARQ timeline illustrated in the HARQ timing diagram 820. That is, in the example illustrated in FIG. 8, the ACKs for downlink subframes SF0 to SF2 of LBT frame 822 collide at uplink subframe SF3 of LBT frame 824 because uplink subframe SF3 of LBT frame 824 is the next opportunity for the access terminal 120 to send an ACK and is at least four milliseconds after each of downlink subframes SF0 to SF2 of LBT frame 822.

In a further aspect, as in the example of FIG. 7, HARQ bundling may be used if the number of uplink subframes is smaller than the number of downlink subframes (not illustrated in FIG. 8).

Figure 9:
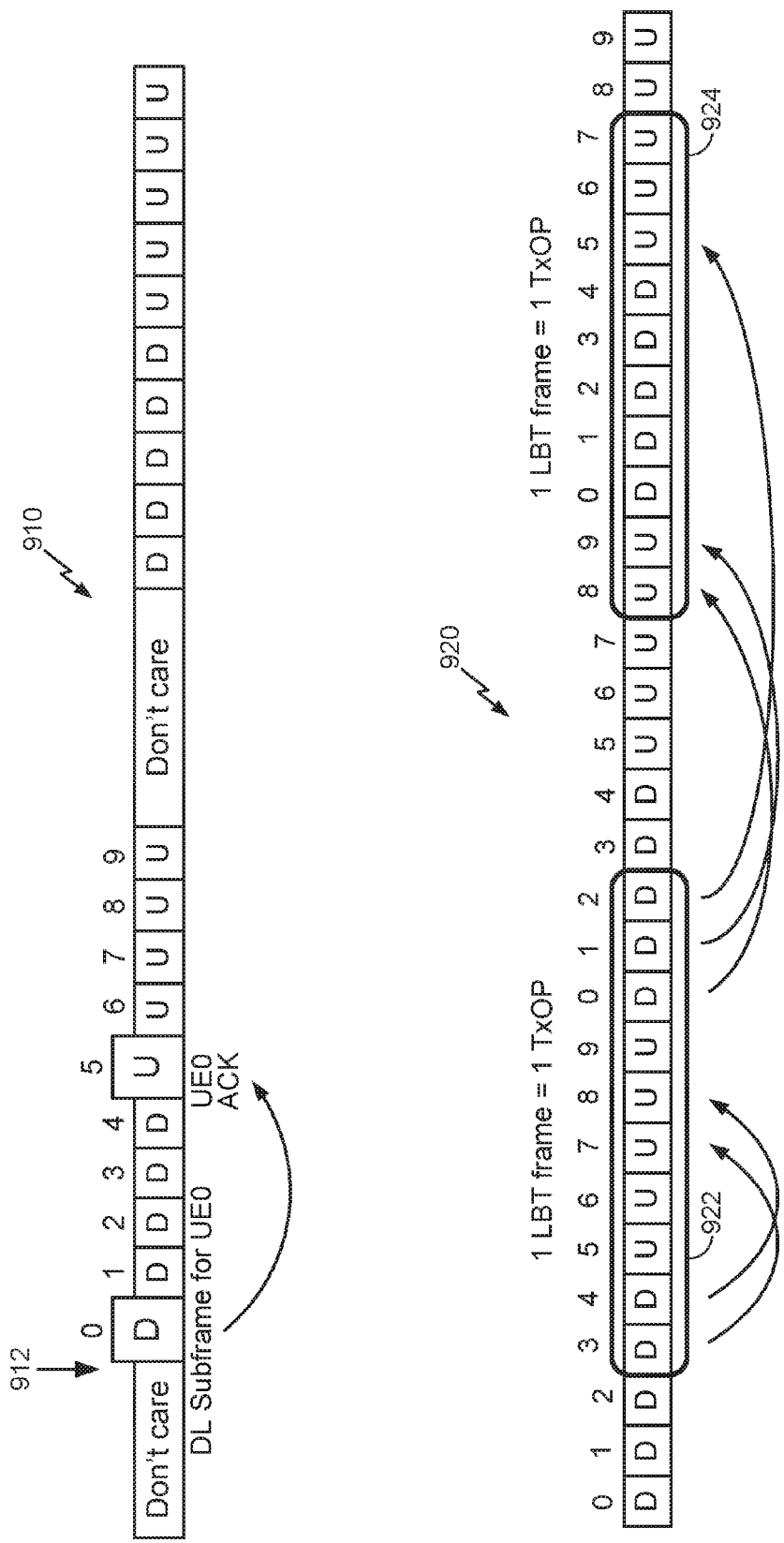
FIG. 9 illustrates other exemplary HARQ timing diagrams in accordance with the techniques described herein.

FIG. 9 illustrates exemplary HARQ timing diagrams based on a hybrid of the number of subframes approach illustrated in FIG. 7 and the absolute time approach illustrated in FIG. 8 according to at least one aspect of the disclosure. A HARQ timing diagram 910 illustrates a HARQ timeline having a floating frame structure, and a HARQ timing diagram 920 illustrates a HARQ timeline having a fixed frame structure. Each HARQ timing diagram 910 and 920 illustrates an exemplary pattern of five downlink subframes followed by five uplink subframes. As will be appreciated, however, there may be more or fewer than five downlink subframes and more or fewer than five uplink subframes, depending on the implementation.

In both HARQ timing diagrams 910 and 920, the access terminal 120 attempts to send a CCA-exempt ACK of a scheduled downlink (D) subframe at the earliest uplink (U) subframe that is at least X milliseconds and Y subframes after the scheduled downlink subframe, as counted within the TxOPs of the access point 110. For example, if the legacy LTE time difference is maintained, X would be four subframes and Y would be four milliseconds. However, X may be more or fewer than four subframes and Y may be more or fewer than four milliseconds.

In the HARQ timing diagram 910, the access terminal 120 (represented in FIG. 9 as "UE0") receives a downlink subframe SF0 from the access point 110 at 912. The access terminal 120 may be ready to ACK the downlink subframe SF0 at subframe SF4 (i.e., four subframes and at least four milliseconds after subframe SF0), however, subframe SF4 is a downlink subframe, so the access terminal 120 waits until the next uplink subframe, here, subframe SF5. At that time, the access terminal 120 can transmit the ACK to the access point 110.

In the HARQ timing diagram 920, an exemplary LBT frame 922 equals one TxOP and another exemplary LBT frame 924 is also equal to one TxOP. As illustrated in the HARQ timing diagram 920, the access terminal 120 receives downlink subframes SF3 and SF4 from the access point 110 during the LBT frame 922. The access terminal 120 ACKs these downlink subframes four subframes and at least four milliseconds later at uplink subframes SF7 and SF8 of LBT frame 922. After the uplink subframes, the access terminal 120 receives three more downlink subframes SF0 to SF2 during the LBT frame 922. However, the access terminal 120 is not able to ACK these subframes four subframes and at least four milliseconds later, as the LBT frame 922 has ended. As such, the access terminal 120 waits until the next LBT frame, i.e., LBT frame 924, to ACK downlink subframes SF0 to SF2 of LBT frame 922. Here, the access terminal 120 is able to ACK downlink subframe SF0 of LBT frame 922 at the first uplink subframe of LBT frame 924, i.e., uplink subframe SF8, because it is at least four subframes and four milliseconds after downlink subframe SF0 of LBT frame 922. The access terminal is also able to ACK downlink subframe SF1 of LBT frame 922 at the next uplink subframe after uplink subframe SF8, i.e., uplink subframe SF9, which is the last uplink subframe before the next sequence of downlink subframes in LBT frame 924. The access terminal 120 then waits until after downlink subframes SF0 to SF4 of LBT frame 924 to ACK downlink subframe SF2 in LBT frame 922. Specifically, the access terminal 120 ACKs downlink subframe SF2 in LBT frame 922 at uplink subframe SF5 in LBT frame 924.

Note that although uplink subframe SF8 of LBT frame 924 is more than four subframes and four milliseconds after subframes SF0 to SF2 of LBT frame 922, similar to the number of subframes approach illustrated in FIG. 7, the hybrid approach prevents the access terminal 120 from sending multiple ACKs during the same uplink subframe, as it would have in the absolute timing approach illustrated in FIG. 8. In this way, latency is decreased compared to the number of subframes approach illustrated in FIG. 7 and collisions are reduced compared to the absolute time approach illustrated in FIG. 8.

In a further aspect, as in the examples of FIG. 7 and FIG. 8, HARQ bundling may be used if the number of uplink subframes is smaller than the number of downlink subframes (not illustrated in FIG. 9).

In an aspect, PUCCH transmissions may be multiplexed (e.g., using frequency division multiplexing (FDM) or code division multiplexing (CDM)) across access terminals to provide collision resolution on the PUCCH. With the approaches described above with reference to FIGS. 7 to 9, PUCCH collisions are still possible among multiple access terminals due to channel access and frame structure uncertainties. Accordingly, the access terminal 120 may choose the frequency resource (e.g., interlacing) based on the relative or absolute time between uplink and downlink transmissions, and/or may choose the CDM code used for multiplexing based on the relative or absolute time between uplink and downlink transmissions.

Figure 10:
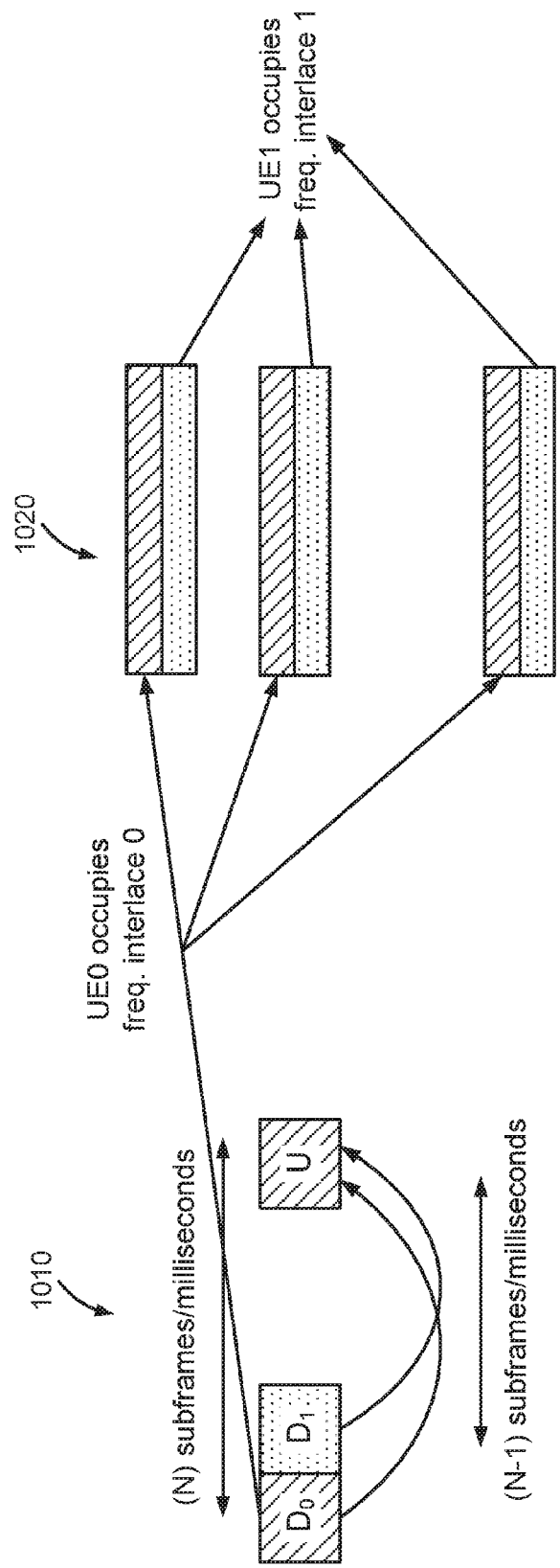
FIG. 10 illustrates an example of collision resolution between two access terminals in accordance with the techniques described herein.

FIG. 10 illustrates an example of collision resolution between two access terminals operating on the PUCCH using FDM/CDM according to at least one aspect of the disclosure. As illustrated by reference number 1010 in FIG. 10, there are N subframes between a downlink subframe $D_0$ and an uplink subframe U, and there are N−1 subframes between a downlink subframe $D_1$ and the uplink subframe U. A first access terminal (represented in FIG. 10 as "UE0") receives downlink subframe $D_0$ and a second access terminal (represented in FIG. 10 as "UE1") receives downlink subframe $D_1$. As illustrated by reference number 1020 in FIG. 10, the first access terminal UE0 occupies frequency interlace "0," and the second access terminal UE1 occupies frequency interlace "1." By occupying different frequency interlaces, both access terminals UE0 and UE1 can transmit acknowledgments in the same uplink subframe of the PUCCH without colliding with each other.

Figure 11:
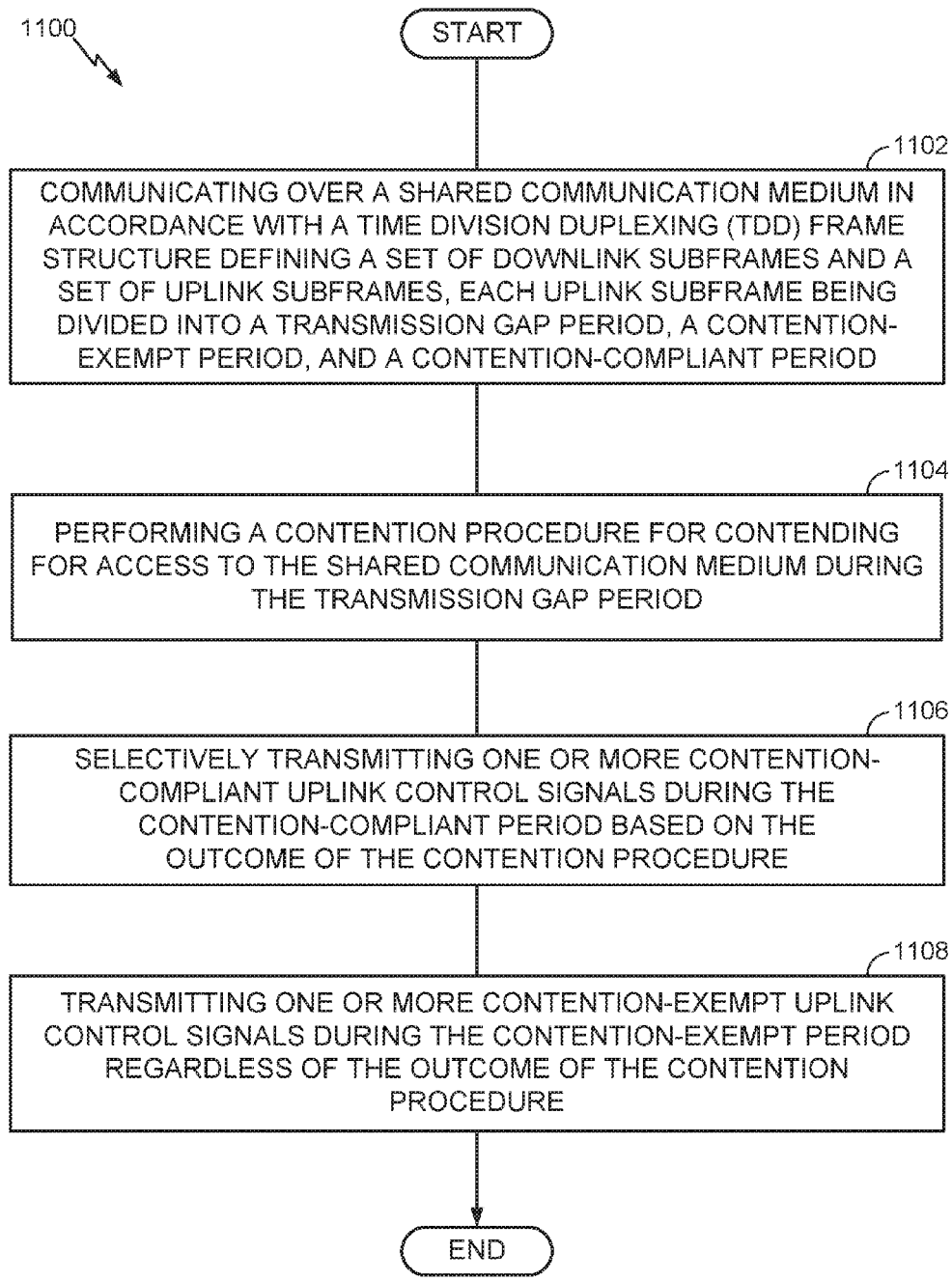
FIG. 11 is a flow diagram illustrating an example method of communication in accordance with the techniques described herein.

FIG. 11 is a flow diagram illustrating an example method of communication in accordance with the techniques described above. The method 1100 may be performed, for example, by the access terminal 120 illustrated in FIG. 1 operating on the shared communication medium 140. As an example, the shared communication medium 140 may include one or more time, frequency, or space resources on an unlicensed radio frequency band shared between LTE technology and Wi-Fi technology devices.

At 1102, the access terminal 120 may communicate over a shared communication medium 140 in accordance with a TDD frame structure defining a set of downlink subframes and a set of uplink subframes, each uplink subframe being divided into a transmission gap period, a contention-exempt period, and a contention-compliant period. At 1104, the access terminal 120 may perform a contention procedure for contending for access to the shared communication medium 140 during the transmission gap period. At 1106, the access terminal 120 may selectively transmit one or more contention-compliant uplink control signals during the contention-compliant period based on the outcome of the contention procedure. At 1108, the access terminal 120 may transmit one or more contention-exempt uplink control signals during the contention-exempt period regardless of the outcome of the contention procedure performed at 1104.

As discussed in more detail above, the uplink control signals may correspond, for example, to a PUCCH. The transmission gap period, the contention-exempt period, and the contention-compliant period may collectively span the entirety or only a portion of each uplink subframe. The set of uplink subframes may include, for example, at least one subframe fully dedicated to uplink signaling, at least one subframe partially dedicated to uplink signaling with a downlink portion and an uplink portion, or a combination thereof.

In some designs, as discussed above with reference to FIGS. 3 to 5, the contention-exempt period may precede the transmission gap period and the transmission gap period may precede the contention-compliant period within each uplink subframe. In other designs, the transmission gap period may precede the contention-compliant period and the contention-compliant period may precede the contention-exempt period within each uplink subframe. In still other designs, the contention-compliant period may precede the contention-exempt period and the contention-exempt period may precede the transmission gap period within each uplink subframe.

As also discussed in more detail above, the performing at 1104, the selectively transmitting at 1106, and the transmitting at 1108 may be performed over a first set of access terminal resources among a plurality of access terminal resources defined for each of the transmission gap period, the contention-exempt period, and the contention-compliant period.

Figure 12:
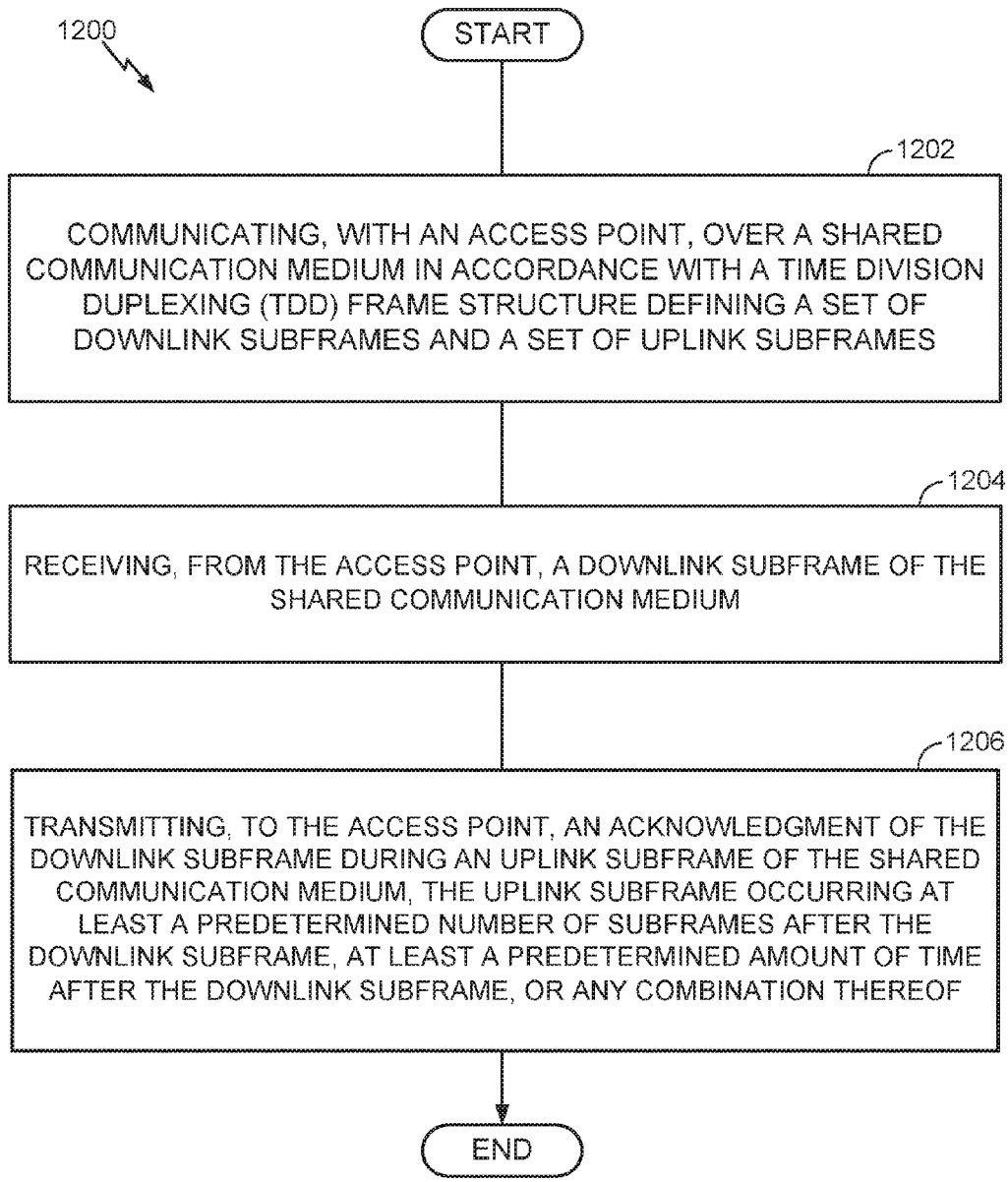
FIG. 12 is a flow diagram illustrating another example method of communication in accordance with the techniques described herein.

FIG. 12 is another flow diagram illustrating an example method of communication in accordance with the techniques described above. The method 1200 may be performed, for example, by the access terminal 120 illustrated in FIG. 1 operating on the shared communication medium 140. As an example, the shared communication medium 140 may include one or more time, frequency, or space resources on an unlicensed radio frequency band shared between LTE technology and Wi-Fi technology devices.

At 1202, the access terminal 120 may communicate over the shared communication medium 140 in accordance with a TDD frame structure defining a set of downlink subframes and a set of uplink subframes. At 1204, the access terminal 120 receives, from the access point 110, a downlink subframe of the shared communication medium 140, as described above with reference to FIGS. 7 to 9.

At 1206, the access terminal 120 transmits, to the access point 110, an acknowledgment of the downlink subframe during an uplink subframe of the shared communication medium 140, as described above with reference to FIGS. 7 to 9. The acknowledgment may be a positive acknowledgment (ACK) or a negative acknowledgment (NACK). As described above, the uplink subframe may occur at least a predetermined number of subframes (e.g., 4 subframes) after the downlink subframe (e.g., as in FIG. 7), at least a predetermined amount of time after the downlink subframe (e.g., as in FIG. 8, or a combination thereof (e.g., as in FIG. 9). In an aspect, the predetermined amount of time may be a predetermined number of milliseconds (e.g., 4 ms).

In an aspect, the transmitting at 1206 may include transmitting the acknowledgment of the downlink subframe during a TxOP of the access point 110 assigned to the access terminal 120. In addition, the uplink subframe occurring at least the predetermined number of subframes after the downlink subframe may be determined based on a count of subframes within a current or subsequent TxOP of the access point 110 assigned to the access terminal 120, as discussed above with reference to FIG. 7. The uplink subframe occurring at least the predetermined amount of time after the downlink subframe may be determined based on a measure of absolute time, as discussed above with reference to FIG. 8. In that case, the uplink subframe occurring at least the predetermined amount of time after the downlink subframe may be the first uplink subframe of a TxOP of the access point 110 assigned to the access terminal 120 occurring at least the predetermined amount of time after the downlink subframe.

In an aspect, the acknowledgment may be a CCA-exempt acknowledgment. Based on the access point 110 not receiving the acknowledgment, the access terminal 120 may receive, from the access point 110, a request (e.g., a polling request) to transmit the acknowledgment. In response, the access terminal 120 may transmit, to the access point 110, another acknowledgment of the downlink subframe during an uplink subframe of the shared communication medium determined by the access point 110. The acknowledgment of the downlink subframe transmitted during the uplink subframe of the shared communication medium determined by the access point 110 may be a CCA-compliant acknowledgment.

For generality, the access point 110 and the access terminal 120 are shown in FIG. 1 only in relevant part as including the control channel manager 112 and control channel manager 122, respectively. It will be appreciated, however, that the access point 110 and the access terminal 120 may be configured in various ways to provide or otherwise support the uplink control signaling techniques discussed herein.

Figure 13:
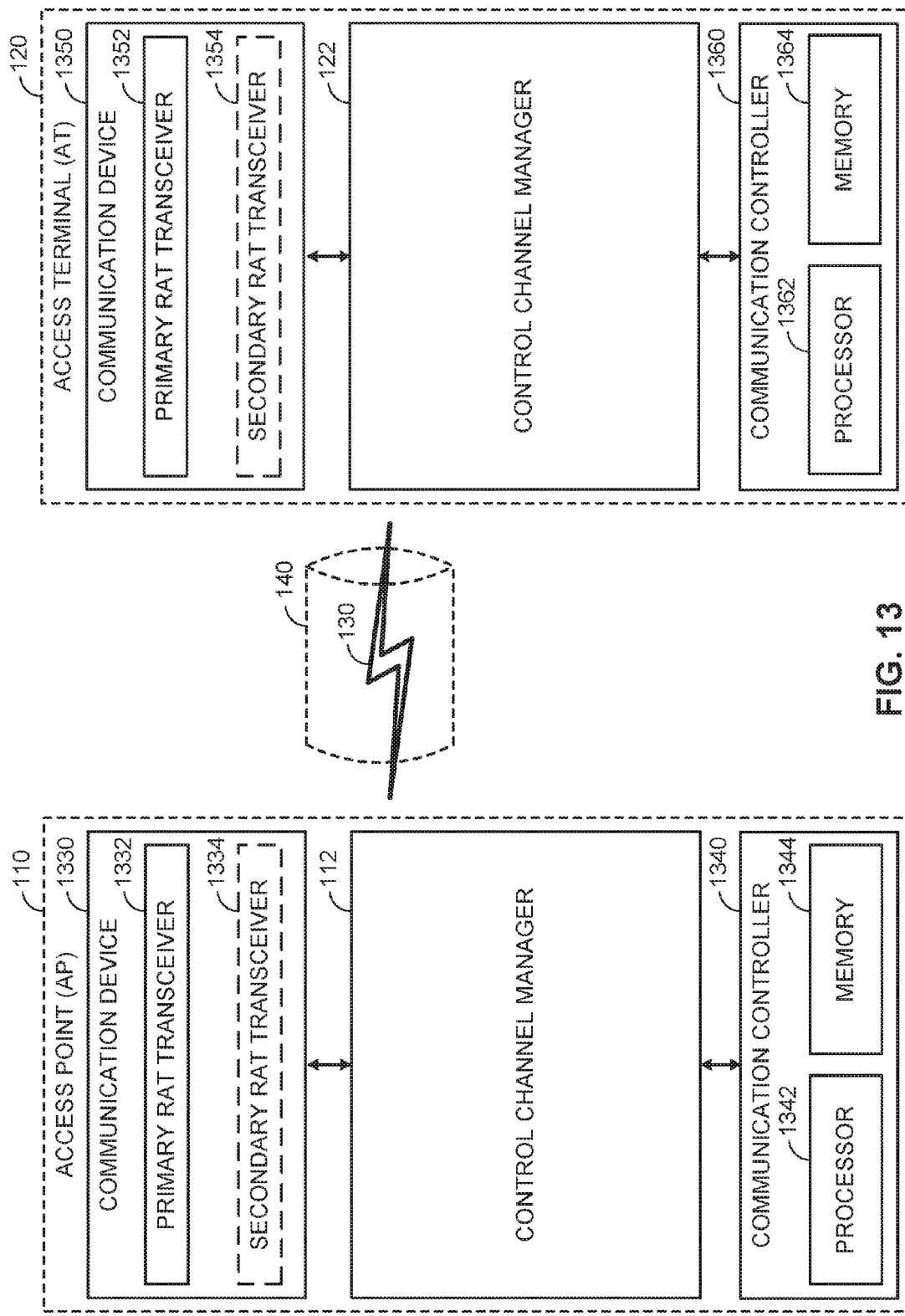
FIG. 13 is a device-level diagram illustrating example components of an access point and an access terminal in more detail.

FIG. 13 is a device-level diagram illustrating example components of the access point 110 and the access terminal 120 of the primary RAT system 100 in more detail. As shown, the access point 110 and the access terminal 120 may each generally include a wireless communication device (represented by the communication devices 1330 and 1350) for communicating with other wireless nodes via at least one designated RAT. The communication devices 1330 and 1350 may be variously configured for transmitting and encoding signals, and, conversely, for receiving and decoding signals in accordance with the designated RAT (e.g., messages, indications, information, pilots, and so on).

The communication devices 1330 and 1350 may include, for example, one or more transceivers, such as respective primary RAT transceivers 1332 and 1352, and, in some designs, (optional) co-located secondary RAT transceivers 1334 and 1354, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1340 and 1360) for controlling operation of their respective communication devices 1330 and 1350 (e.g., directing, modifying, enabling, disabling, etc.). The communication controllers 1340 and 1360 may include one or more processors 1342 and 1362, and one or more memories 1344 and 1364 coupled to the processors 1342 and 1362, respectively. The memories 1344 and 1364 may be configured to store data, instructions, or a combination thereof, either as on-board cache memory, as separate components, a combination, etc. The processors 1342 and 1362 and the memories 1344 and 1364 may be standalone communication components or may be part of the respective host system functionality of the access point 110 and the access terminal 120.

It will be appreciated that the control channel manager 112 and the control channel manager 122 may be implemented in different ways. In some designs, some or all of the functionality associated therewith may be implemented by or otherwise at the direction of at least one processor (e.g., one or more of the processors 1342 and/or one or more of the processors 1362) and at least one memory (e.g., one or more of the memories 1344 and/or one or more of the memories 1364). In other designs, some or all of the functionality associated therewith may be implemented as a series of interrelated functional modules.

Figure 14:
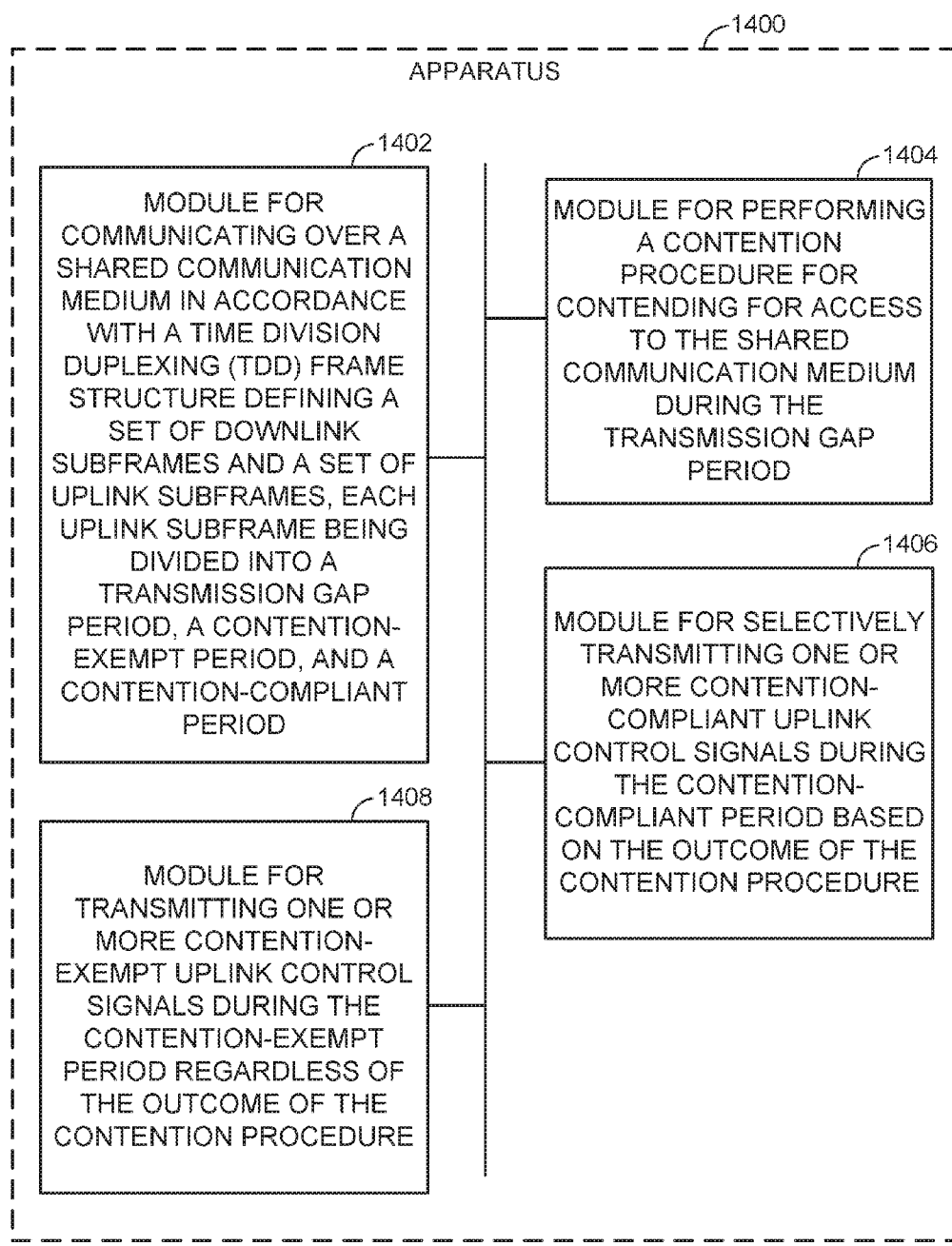
FIG. 14 illustrates an example apparatus represented as a series of interrelated functional modules in accordance with the techniques described herein.

FIG. 14 illustrates an example apparatus for implementing the control channel manager 122 represented as a series of interrelated functional modules. In the illustrated example, the apparatus 1400 includes a module for communicating 1402, a module for performing 1404, a module for selectively transmitting 1406, and a module for transmitting 1408.

The module for communicating 1402 may be configured to communicate over a shared communication medium 140 in accordance with a TDD frame structure defining a set of downlink subframes and a set of uplink subframes, each uplink subframe being divided into a transmission gap period, a contention-exempt period, and a contention-compliant period. The module for performing 1404 may be configured to perform a contention procedure for contending for access to the shared communication medium 140 during the transmission gap period. The module for selectively transmitting 1406 may be configured to selectively transmit one or more contention-compliant uplink control signals during the contention-compliant period based on the outcome of the contention procedure. The module for transmitting 1408 may be configured to transmit one or more contention-exempt uplink control signals during the contention-exempt period regardless of the outcome of the contention procedure.

Figure 15:
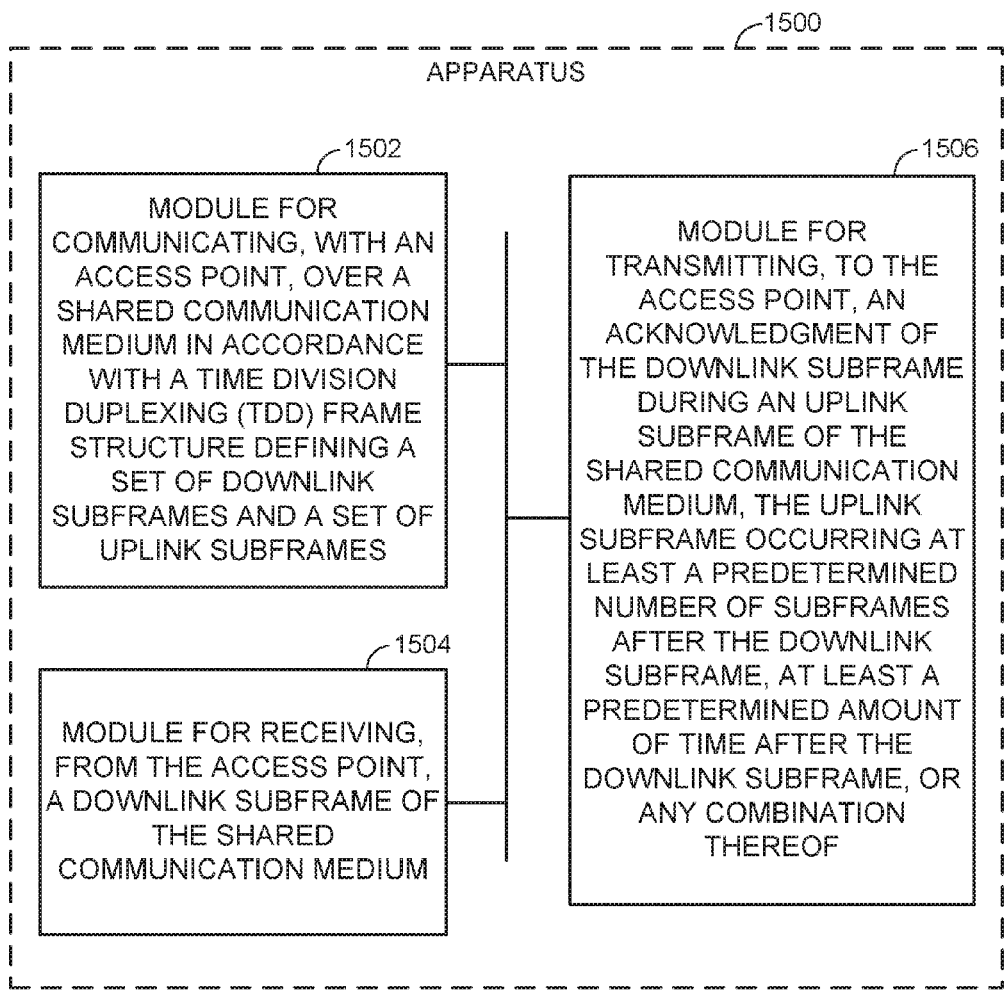
FIG. 15 illustrates another example apparatus represented as a series of interrelated functional modules in accordance with the techniques described herein.

FIG. 15 illustrates another example apparatus for implementing the control channel manager 122 represented as a series of interrelated functional modules. In the illustrated example, the apparatus 1500 includes a module for communicating 1502, a module for receiving 1504, and a module for transmitting 1506.

The module for communicating 1502 may be configured to communicate over the shared communication medium 140 in accordance with a TDD frame structure defining a set of downlink subframes and a set of uplink subframes. The module for receiving 1504 may be configured to receive, from the access point 110, a downlink subframe of the shared communication medium 140. The module for transmitting 1506 may be configured to transmit, to the access point 110, an acknowledgment of the downlink subframe during an uplink subframe of the shared communication medium 140. The acknowledgment may be a positive acknowledgment (ACK) or a negative acknowledgment (NACK). As described above, the uplink subframe may occur at least a predetermined number of subframes (e.g., 4 subframes) after the downlink subframe (e.g., as in FIG. 7), at least a predetermined amount of time after the downlink subframe (e.g., as in FIG. 8, or a combination thereof (e.g., as in FIG. 9).

The functionality of the modules of FIGS. 14-15 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 14-15, as well as other components and functions described herein, may be implemented using any suitable means. Such means also may be implemented, at least in part, using corresponding structure as taught herein. For example, the components described above in conjunction with the "module for" components of FIGS. 14-15 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 14-15 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of contending for access to a shared communication medium, comprising:
    communicating over the shared communication medium in accordance with a Time Division Duplexing (TDD) frame structure defining a set of downlink subframes and a set of uplink subframes, each uplink subframe being divided into a transmission gap period, a contention-exempt period, and a contention-compliant period, wherein the set of uplink subframes comprises at least one subframe fully dedicated to uplink signaling, at least one subframe partially dedicated to uplink signaling with a downlink portion and an uplink portion, or a combination thereof;
    performing a contention procedure for contending for access to the shared communication medium during the transmission gap period;
    selectively transmitting one or more contention-compliant uplink control signals during the contention-compliant period based on an outcome of the contention procedure; and
    transmitting one or more contention-exempt uplink control signals during the contention-exempt period regardless of the outcome of the contention procedure,
    wherein the performing, the selectively transmitting, and the transmitting are performed over a first set of access terminal resources among a plurality of access terminal resources defined for each of the transmission gap period, the contention-exempt period, and the contention-compliant period.

2. The method of claim 1, wherein the uplink control signals correspond to a Physical Uplink Control Channel (PUCCH).

3. The method of claim 1, wherein the transmission gap period, the contention-exempt period, and the contention-compliant period collectively span the entirety or only a portion of each uplink subframe.

4. The method of claim 1, wherein the contention-exempt period precedes the transmission gap period and the transmission gap period precedes the contention-compliant period within each uplink subframe.

5. The method of claim 1, wherein the transmission gap period precedes the contention-compliant period and the contention-compliant period precedes the contention-exempt period within each uplink subframe.

6. The method of claim 1, wherein the contention-compliant period precedes the contention-exempt period and the contention-exempt period precedes the transmission gap period within each uplink subframe.

7. An apparatus for contending for access to a shared communication medium, comprising:
    a transceiver; and
    at least one processor configured to cause the transceiver to:
    communicate over the shared communication medium in accordance with a Time Division Duplexing (TDD) frame structure defining a set of downlink subframes and a set of uplink subframes, each uplink subframe being divided into a transmission gap period, a contention-exempt period, and a contention-compliant period, wherein the set of uplink subframes comprises at least one subframe fully dedicated to uplink signaling, at least one subframe partially dedicated to uplink signaling with a downlink portion and an uplink portion, or a combination thereof;

perform a contention procedure for contending for access to the shared communication medium during the transmission gap period;

selectively transmit one or more contention-compliant uplink control signals during the contention-compliant period based on an outcome of the contention procedure; and transmit one or more contention-exempt uplink control signals during the contention-exempt period regardless of the outcome of the contention procedure, wherein performance of the contention procedure, selective transmission of the one or more contention-compliant uplink control signals, and transmission of the one or more contention-exempt uplink control signals are performed over a first set of access terminal resources among a plurality of access terminal resources defined for each of the transmission gap period, the contention-exempt period, and the contention-compliant period.

8. The apparatus of claim 7, wherein the uplink control signals correspond to a Physical Uplink Control Channel (PUCCH).

9. The apparatus of claim 7, wherein the transmission gap period, the contention-exempt period, and the contention-compliant period collectively span the entirety or only a portion of each uplink subframe.

10. The apparatus of claim 7, wherein the contention-exempt period precedes the transmission gap period and the transmission gap period precedes the contention-compliant period within each uplink subframe.

11. The apparatus of claim 7, wherein the transmission gap period precedes the contention-compliant period and the contention-compliant period precedes the contention-exempt period within each uplink subframe.

12. The apparatus of claim 7, wherein the contention-compliant period precedes the contention-exempt period and the contention-exempt period precedes the transmission gap period within each uplink subframe.

13. An apparatus for contending for access to a shared communication medium, comprising:

means for communicating over the shared communication medium in accordance with a Time Division Duplexing (TDD) frame structure defining a set of downlink subframes and a set of uplink subframes, each uplink subframe being divided into a transmission gap period, a contention-exempt period, and a contention-compliant period, wherein the set of uplink subframes comprises at least one subframe fully dedicated to uplink signaling, at least one subframe partially dedicated to uplink signaling with a downlink portion and an uplink portion, or a combination thereof;

means for performing a contention procedure for contending for access to the shared communication medium during the transmission gap period;

means for selectively transmitting one or more contention-compliant uplink control signals during the contention-compliant period based on an outcome of the contention procedure; and means for transmitting one or more contention-exempt uplink control signals during the contention-exempt period regardless of the outcome of the contention procedure, wherein performance of the contention procedure, selective transmission of the one or more contention-compliant uplink control signals, and transmission of the one or more contention-exempt uplink control signals are performed over a first set of access terminal resources among a plurality of access terminal resources defined for each of the transmission gap period, the contention-exempt period, and the contention-compliant period.

14. A non-transitory computer-readable medium for contending for access to a shared communication medium, comprising:

at least one instruction instructing a device to communicate over the shared communication medium in accordance with a Time Division Duplexing (TDD) frame structure defining a set of downlink subframes and a set of uplink subframes, each uplink subframe being divided into a transmission gap period, a contention-exempt period, and a contention-compliant period, wherein the set of uplink subframes comprises at least one subframe fully dedicated to uplink signaling, at least one subframe partially dedicated to uplink signaling with a downlink portion and an uplink portion, or a combination thereof;

at least one instruction instructing the device to perform a contention procedure for contending for access to the shared communication medium during the transmission gap period;

at least one instruction instructing the device to selectively transmit one or more contention-compliant uplink control signals during the contention-compliant period based on an outcome of the contention procedure; and at least one instruction instructing the device to transmit one or more contention-exempt uplink control signals during the contention-exempt period regardless of the outcome of the contention procedure, wherein performance of the contention procedure, selective transmission of the one or more contention-compliant uplink control signals, and transmission of the one or more contention-exempt uplink control signals are performed over a first set of access terminal resources among a plurality of access terminal resources defined for each of the transmission gap period, the contention-exempt period, and the contention-compliant period.

* * * * *